United States Patent [19]

Wagner

[11] Patent Number: 4,819,544
[45] Date of Patent: Apr. 11, 1989

[54] TWO-STAGE REACTION DEVICE FOR VACUUM BRAKE BOOSTER VALVES

[75] Inventor: Wilfried Wagner, Hattersheim, Fed. Rep. of Germany

[73] Assignee: ITT Industries, Inc., New York, N.Y.

[21] Appl. No.: 562,842

[22] Filed: Dec. 19, 1983

[30] Foreign Application Priority Data

Dec. 23, 1982 [DE] Fed. Rep. of Germany ....... 3247701

[51] Int. Cl.$^4$ .............................................. F15B 9/10
[52] U.S. Cl. .................................................. 91/369.4
[58] Field of Search ............. 91/369 B, 369 A, 369 R, 91/376 R, 369.4; 60/547.1, 552

[56] References Cited

U.S. PATENT DOCUMENTS

| 3,009,449 | 11/1961 | Rike | 91/369 B |
| 3,470,697 | 10/1969 | Pech et al. | 91/369 R |
| 4,447,897 | 5/1984 | Boehm | 91/369 B |

FOREIGN PATENT DOCUMENTS 2155169  5/1973  Fed. Rep. of Germany.
2822101 11/1979  Fed. Rep. of Germany.

Primary Examiner—Robert E. Garrett
Assistant Examiner—George Kapsalas
Attorney, Agent, or Firm—James B. Raden

[57] ABSTRACT

In a two-stage reaction device for vacuum brake boosters, the clearance at the piston rod will be reduced by the piston rod acting directly on the valve piston which comprises a head portion connected via a neck portion at its end close to the vacuum chamber. The head portion and the rear end surface of the valve piston contain abutment surfaces which cooperate with levers. The levers, in turn, are moved by the push rod coupled to the master cylinder via a fork-like shaped pressure member with prong-shaped attachments. In this arrangement, one end of each lever is held resiliently between a supporting ring and a spring plate, with the supporting ring including edges about which the levers are tiltable when the pressure member acts on the other ends of the levers. The tilting movement of the lever takes place abruptly and only in the area between the two abutment surfaces at the valve piston and at the valve piston's head portion, respectively, while the two facing ends of the levers are in constant abutment on one of the two abutment surfaces and the two radially outwardly disposed ends of the levers abut on the supporting ring.

5 Claims, 3 Drawing Sheets

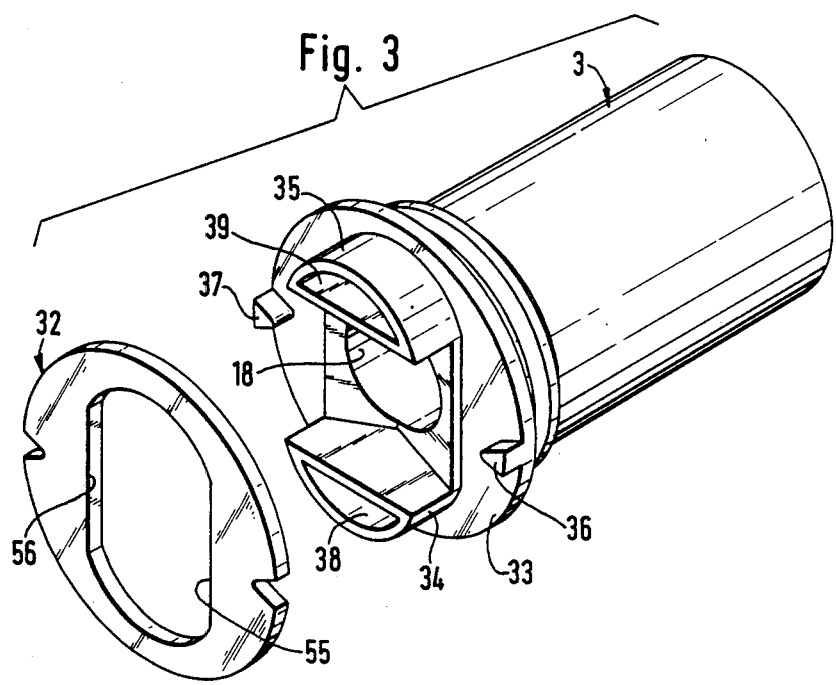
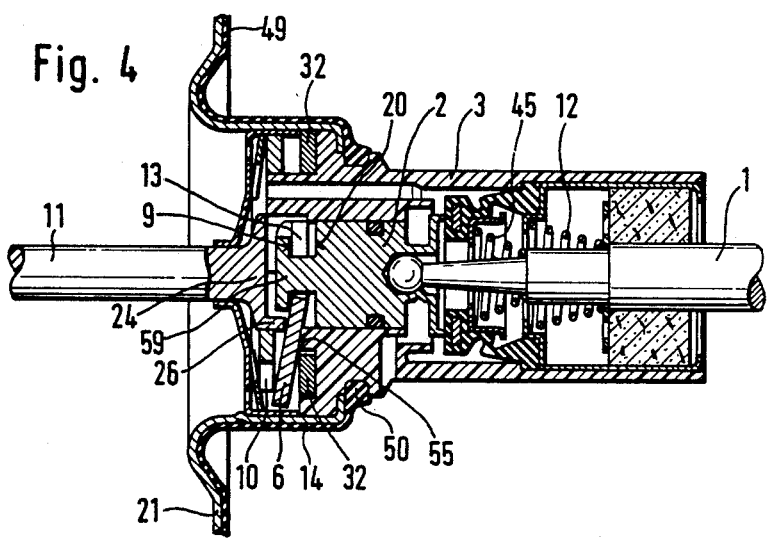

TWO-STAGE REACTION DEVICE FOR VACUUM BRAKE BOOSTER VALVES

BACKGROUND OF THE INVENTION

1. Field of the Invention

The present invention relates to a two-stage reaction device for vacuum brake boosters with a vacuum chamber in which a constant pressure prevails and with a working chamber in which varying pressures prevail, the chambers being separated by a movable wall. A control valve actuatable by a brake pedal governs the differentials of pressure acting on the movable wall. A push rod controlled by the brake pedal acts on a master cylinder and on levers which are in engagement with the movable wall at a first location. The push rod is connected to a plate at a second location, the said first location being arranged radially farther outwardly than the second location. The levers are acted upon by a cup spring at a third radially spaced location, the cup spring being arranged on the side of the levers close to the vacuum chamber. The third location is located further outwardly radially than the first location. A spring plate is interposed between the cup spring and the levers which is provided with bearings for the levers at the side close to said levers.

2. Description of the Prior Art

From U.S. Pat. No. 3,102,453, issued Sept. 3, 1963 to F. W. Brooks et al., a vacuum brake booster is known which comprises a constant atmospheric pressure chamber and a working chamber in which different pressures prevail, as well as a movable wall dividing the chambers, the wall being mounted on a push rod, and a control valve which is actuatable by a brake pedal. The control valve controls the differentials of pressure acting on the movable wall. The end of the push rod adjacent to the control valve is provided with a pin having a plate pressed thereon. Disposed between the plate and the control valve are three reaction levers which, on the one side, take support radially outwardly against the movable wall and radially inwardly against a spring, while they bear against the plate on the other side. In this arrangement, a spring is located in an opening in the valve piston of the control valve, the opening being adjacent to the vacuum chamber. The spring acts to decouple the piston rod from the push rod. The bias of the spring provides for what is termed "two-stage action" which means the retardation of the reaction force acting on the brake pedal. The magnitude of the "two-stage action" is dependent upon the strength of the reaction-delaying spring and the distances between the points of force impact.

In known vacuum brake boosters with two-stage reaction devices, the reaction levers (such as those shown in FIG. 3 of the cited Brooks et al. reference) bear with their outer ends directly against a component which directs the control valve and which is rigidly connected to the movable wall so that, as explained previously, the reaction levers act on the movable wall. This lever assembly cannot be utilized in devices comprising a control housing made of any thermoplastics, since the latter material does not permit the levers to bear directly against the control housing. Moreover, the space available in this known arrangement is so small that assembly problems frequently arise.

SUMMARY OF THE INVENTION

It is a major object of the present invention to provide a two-stage reaction device for vacuum brake boosters of the type generally described which can be employed in power brake boosters having a control housing composed of thermoplastics. Furthermore, the two-stage reaction device is designed such that the lost travel at the piston rod, which is coupled to the pedal, will be reduced to a minimum without allowing the feel for the actuation and the release of the vehicle brake to be lost. Finally, the two-stage reaction device is of straightforward design and is composed of component parts affording low-cost manufacture.

This major object is achieved according to the present invention. The present valve piston which is displaceable by the piston rod, which is in turn supported in the control housing and which cooperates with the poppet valve includes at its end close to the push rod two oppositely lying abutment surfaces. The radially inwardly disposed edges and the lateral surfaces of the push rod actuated levers bear against said abutment surfaces; the distance between the two abutment surfaces which partially embrace the facing ends of the levers allows a tilting movement of the levers in the event of a relative movement between the push rod and the valve piston, the push rod bearing with its pressure member against the levers.

Preferably, the valve piston in conjunction with the two abutment surfaces is formed as a rotationally symmetric element, the flange-like head portion which contains the one abutment surface being coupled to the part of the valve piston close to the piston rod via a shaped neck portion.

To cause tilting movement of the levers, the end of the longitudinally slidable push rod coupled to the master cylinder comprises a fork-shaped pressure member whose prong-like attachments extend in a longitudinal direction of the brake booster to take effect on the radially inwardly disposed halves of the levers.

Advantageously, the levers abut with their lateral surfaces adjacent to the piston rod on a supporting ring whose central opening is designed as an elongated hole, the parallel, inwardly disposed edges of the opening forming the bearings, about which the levers are tiltable.

To the end that the levers are conformed to the neck portion of the valve piston, said levers contain at their edges facing each other notches or recesses which partially enclose the neck portion. To prevent torsion of the supporting ring or of the spring plate in relation to the control housing, or to prevent them from changing their position in relation to the two levers, the control housing disposes at its end surface close to the vacuum chamber of two supporting members which extend in a longitudinal direction, which contain channels and which project through openings in the supporting ring and in the spring plate.

BRIEF DESCRIPTION OF THE DRAWINGS

The present invention may be configured in a plurality of embodiments. One such embodiment is schematically illustrated in greater detail with reference to the accompanying drawings in which:

FIG. 3 is a perspective view of the control housing of the vacuum brake booster; and FIG. 4 is a sectional view of the two-stage reaction device according to FIG. 1, however, with the valve piston being shown in its release position.

DETAILED DESCRIPTION OF THE PREFERRED EMBODIMENT

Figure 1:
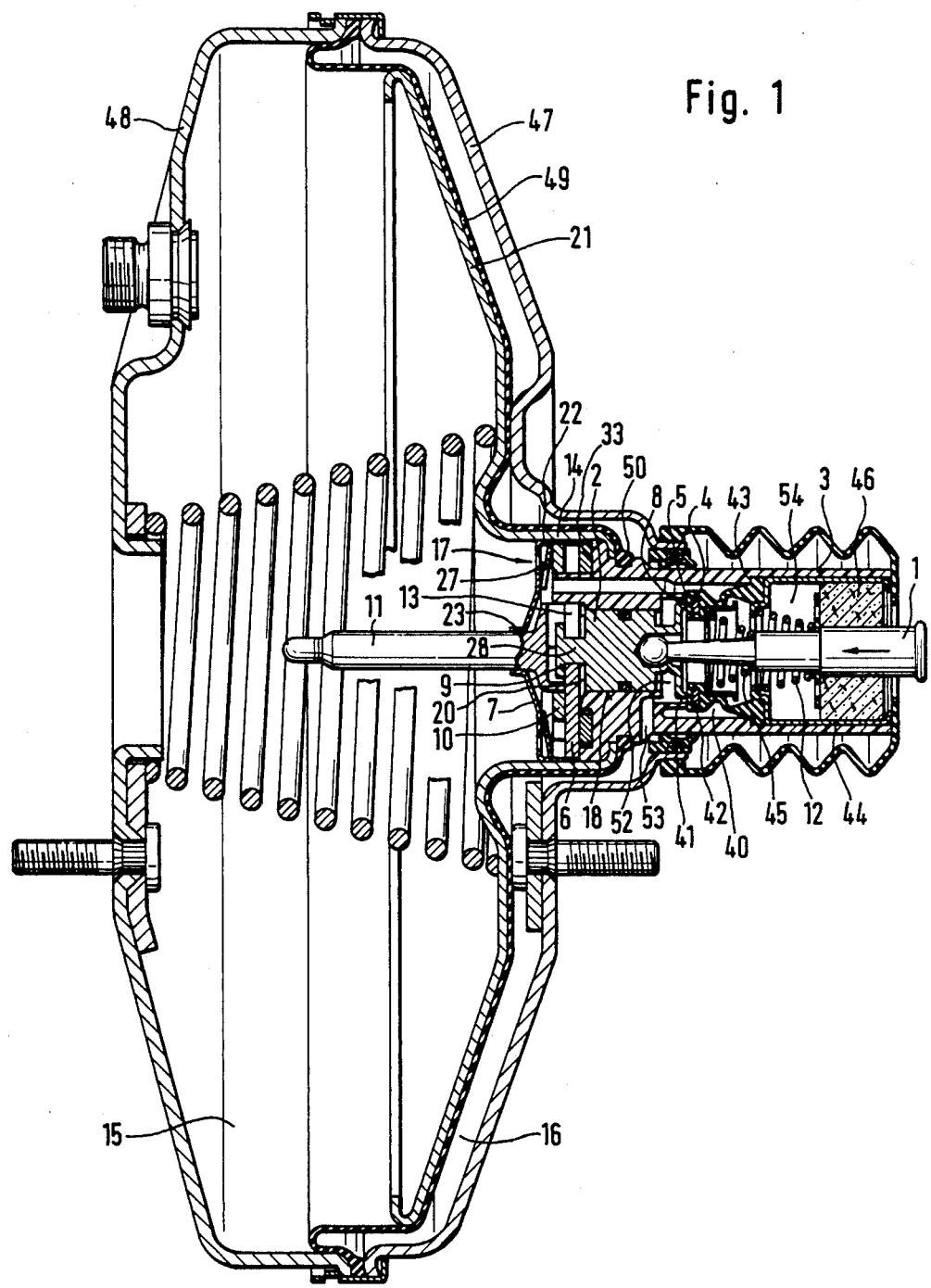
FIG. 1 is a sectional view taken in two vertically disposed planes through a vacuum brake booster with a two-stage reaction device adapted to be preassembled.

FIG. 1 shows a control housing 3 which is secured to a diaphragm plate 21 which in conjunction with diaphragm 49 isolates a vacuum chamber 15 from a working chamber 16 by means of a neck 14. A two-stage reaction device 17 is arranged in the neck 14. A valve piston 2 is guided in a coaxial bore 18 in the control housing 3. The valve piston 2 receives on the one side a spherical end 19 of a piston rod 1, while the other side of the valve piston 2 includes a flange-like head portion 59 having an abutment surface or stop 9 which limits the axial movement of the valve piston 2 in the direction of the piston rod 1. An abutment surface 20 is provided in the middle of the side of the valve piston 2 facing the two-stage reaction device 17.

Figure 2:
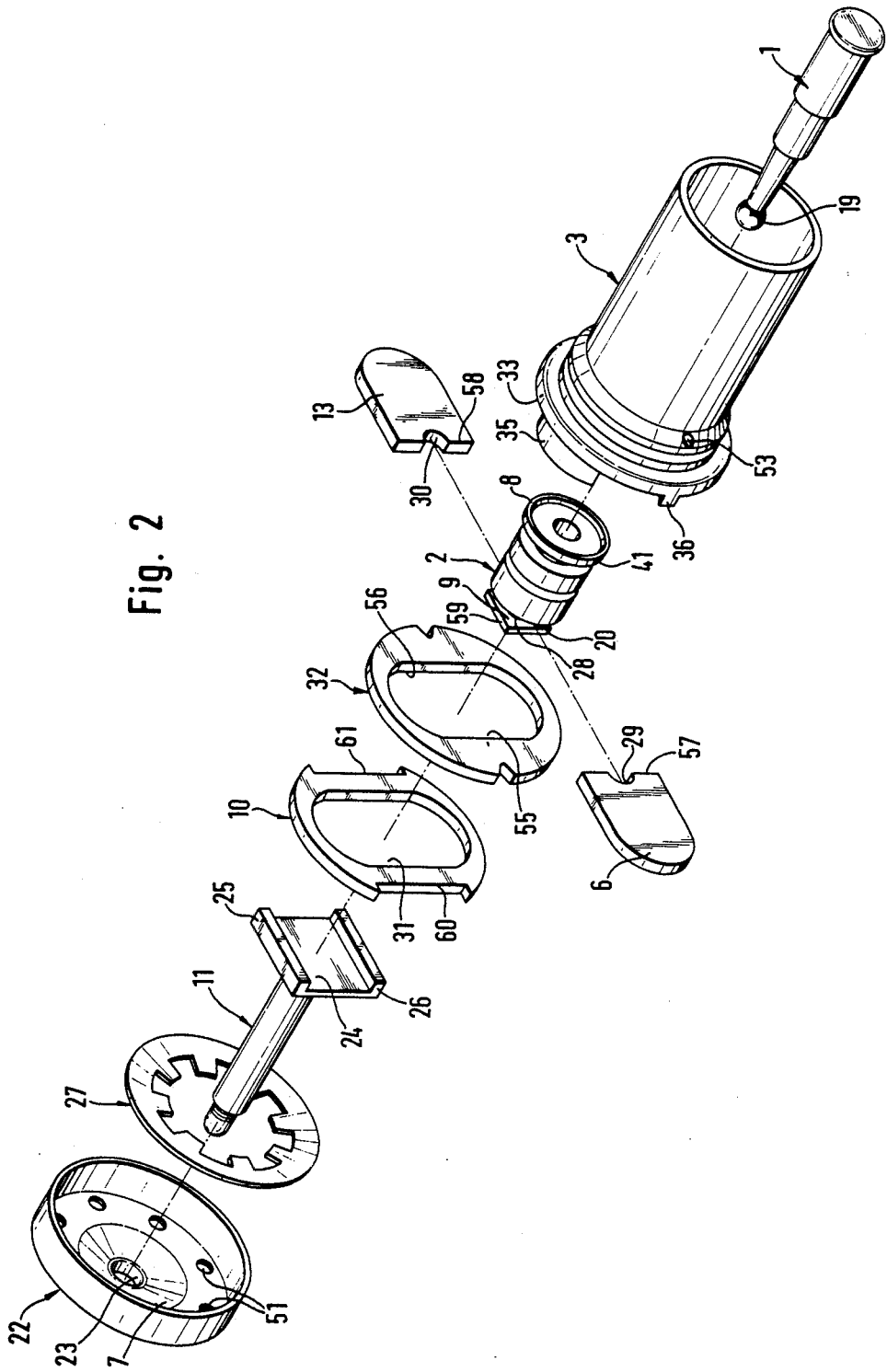
FIG. 2 is an exploded perspective view of the components of the two-stage reaction device adapted to be preassembled.

The two-stage reaction device 17 is located on the side of the diaphragm plate 21 adjacent the vacuum chamber 15. The device comprises a bowl-shaped guide element 22 which is provided with a guide sleeve 23 extending coaxially relative to the valve piston 2 and having guided in it a push rod 11 which acts on the piston of a (non-illustrated) master cylinder. A pressure member 24 is disposed at the end of the push rod 11. The connection between the push rod 11 and the pressure member 24 is suitably effected by means of pressure welding. The pressure member 24 is of rectangular shape and comprises axially extending walls or attachments 25 and 26 at two lognitudinal sides. In front of these attachments 25 and 26, there are supported two flat plate-like, levers 6 and 13 which are rounded at their outer sides as seen best in FIG. 2. The flat levers 6 and 13 include at their sides close to the collar 28 of the valve piston 2, recesses 29 and 30 which together embrace the neck portion of collar 28.

A cup spring or crowned washer 27 takes support on the bottom 7 of the guide element 22. The force of the cup spring 27 acts via the spring plate 10 on the levers 6 and 13. The spring plate 10 contains a roughly rectangular opening 31 extending through which are the extension walls 25 and 26 of the pressure member 24.

At its end surface 33 adjacent to the push rod, the control housing 3 (as best seen in FIG. 3) is provided with two axially extending, finger-shaped supporting members 34 and 35 and two pins 36 and 37. The supporting members 34 and 35 contain recesses 38 and 39 which connect the vacuum chamber 15 to the annular channel 40 whose radially inwardly disposed annular edge forms the control housing seat 5. The valve piston 2 that is slidably supported in the control housing 3 includes at its end close to the piston rod a collar 41, whose circumferential edge forms the valve piston seat 8. Inserted into the control housing is a poppet valve 4 made of any flexible material, the end of which close to the push rod is stiffened by a metal ring 42, the end surface cooperating both with the valve piston seal 8 and with the control housing seat 5. While the end of the poppet valve 4 close to the piston rod abuts against a step 43 of the control housing 3 and is held there by a sleeve 44, its stiffened end close to the push rod is urged in the direction of the arrow by a spring 45 which bears against the piston rod 1. A filter ring 46 is arranged at the outer end of the control housing 3. Disposed between the control housing 3 and the two housing shells 47 and 48 of the booster is a rolling diaphragm 49 whose central opening is reinforced by a bead 50, the bead being inserted into a circumferential groove of the control housing 3 and abutting primarily against the surface of the diaphragm plate 21 close to the piston rod.

Operation of the two-stage reaction device is as follows:

Upon displacement of the piston rod 1 in the direction of the arrow, the control housing seat 5 will first close the air passage leading from the vacuum chamber 15 via the openings 51 (FIG. 2), the recesses 38 and 39, the annular channel 40, the annular chamber 52 and the radially extending bore 53 to the working chamber 16. Almost simultaneously the passage at the valve piston seat 8 will start to open, allowing atmospheric air to propagate via the filter ring 46, through the chamber 54, the annular chamber 52 and the bore 53 into the working chamber 16. As soon as the diaphragm plate 21, which in conjunction with diaphragm 49 isolates the two chambers 15 and 16, starts to move in the direction of the arrow, the reaction force at the push rod 11 will act via the pressure member 24 including the two attachments 25 and 26 onto the levers 6 and 13 to move said levers 6 and 13 to assume their working position. In this position, the pressure member 24 tilts the levers 6 and 13 about the edges 55 and 56 at the supporting ring 32 until the radially inwardly disposed edges 57 and 58 of levers 6 and 13, respectively, abut against the abutment surface 20 of valve piston 2.

Upon termination of the force acting on the piston rod 1, a reaction force will act on the push rod 11 until attainment of complete pressure removal in the master cylinder (not shown). The cylinder is actuated by the push rod 11, as a result whereof the levers 6 and 13 are maintained in their inclined position. The spring 12 will cause movement of the valve piston 2 to the right so that the control housing seat 5 opens and re-establishes communication between the vacuum chamber 15 and the working chamber 16. When the pressure in the master cylinder actuated by the push rod 11 has been removed, the cup spring 27 will urge the levers 6 and 13 to reassume their position (vertically relative to the device's longitudinal axis) illustrated in FIG. 1 and the valve piston 2 will be drawn to the left by the action of the levers 6 and 13 against stop 9 until the valve piston 2 is positioned as shown in FIG. 1 whereby the control housing sealing seat 5 will be almost closed.

Thus, the advantage of the inventive two-stage reaction device for vacuum brake boosters described herein, in principle, is that potential lost motion at the piston rod 1 will be reduced to a minimum by maintaining the valve piston 2 in the period of release in a "stand-by position" wherein a reaction force acts on the push rod 11 causing the two levers 6 and 13 to remain in their inclined position (i.e. causes the levers 6 and 13 to assume the position shown in FIG. 4). Not until the pressure has been removed completely will the levers 6 and 13 again resume their vertical position in the control housing 3 between the abutment surface 20 and the stop 9 whereby the reaction effect of the master cylinder will terminate.

The forms of the invention illustrated and described herein are but preferred embodiments of these teachings. They are shown as illustrations of the inventive concepts, however, rather than by way of limitation, and it is pointed out the various modifications and alterations may be indulged within the scope of the appended claims.

What is claimed is:

1. A two-stage reaction device for a vacuum brake booster comprising: a vacuum chamber in which a constant pressure prevails and a working chamber in which varying pressures prevail, the chambers being separated by a movable wall and having a central axis, a control housing including a control valve actuatable by a brake pedal and governing differentials of pressure acting on the movable wall, a push rod coupled to act on a master cylinder and being generally aligned with the central axis of the chambers, said push rod having a pressure member connected thereto, levers in engagement with the movable wall at a first location and with the pressure member at a second location, the said first location being arranged radially farther outwardly from said central axis than the second location, the levers being acted upon by a crowned spring at a third location, the said crowned spring being positioned on the side of the levers nearest to the vacuum chamber, the third location having a smaller radial distance from said central axis than the first location, a spring plate interposed between the crowned spring and the levers, a valve piston being displaceable by a piston rod upon actuation of the brake, said piston rod being supported in the control housing, said valve piston including at an end close to the push rod two oppositely disposed abutment surfaces against which the radially inwardly disposed edges and the lateral surface of the levers abut, the distance between the two abutment surfaces, which surfaces partially embrace the facing ends of the levers enabling a tilting movement of the levers in the event of the relative movement between the push rod and the valve piston, with said pressure member connected to said push rod bearing against the lever, the valve piston in conjunction with the two abutment surfaces being a rotationally symmetric element, said valve piston including a flange-like head having one of said abutment surfaces thereon and said flange-like head being connected to the valve piston adjacent to the piston rod by a neck portion.

2. A two-stage reaction device for a vacuum brake booster as claimed in claim 1, wherein the pressure member is a fork-like shaped member whose prong-shaped attachments extend in a longitudinal direction of the device to act on the radially inwardly disposed surfaces of the levers.

3. A two-stage reaction device for a vacuum brake booster as claimed in claim 1, wherein the two levers are provided at each of their facing edges with notches or recesses, the shape whereof is conformed to the shape of the neck portion.

4. A two-stage reaction device for a vacuum brake booster as claimed in claim 1, wherein the levers abut with their lateral surfaces adjacent to the piston rod on a supporting ring whose central opening is shaped as an elongated hole, with the parallel, inwardly disposed edges of the opening forming the bearings, about which the levers are tiltable.

5. A two-stage reaction device for a vacuum brake booster as claimed in claim 4, wherein the control housing includes at its end surface close to the vacuum chamber two supporting members which extend in a longitudinal direction and which contain recesses, the said supporting members shaped to project through openings in the supporting ring and in the spring plate to prevent torsion of the spring plate and the supporting ring.

* * * * *